US010009457B2

(12) United States Patent
Polega et al.

(10) Patent No.: US 10,009,457 B2
(45) Date of Patent: *Jun. 26, 2018

(54) DE-DUPING IDENTITIES USING NETWORK ANALYSIS AND BEHAVIORAL COMPARISONS

(71) Applicant: Mark43, Inc., New York, NY (US)

(72) Inventors: Matthew Polega, New York, NY (US); Scott Crouch, New York, NY (US); Florian Mayr, Wainfleet (CA); Stephen Okano, New York, NY (US)

(73) Assignee: MARK43, INC., New York, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/431,993

(22) Filed: Feb. 14, 2017

(65) Prior Publication Data
US 2017/0155757 A1    Jun. 1, 2017

Related U.S. Application Data

(63) Continuation of application No. 15/185,545, filed on Jun. 17, 2016, now Pat. No. 9,602,674.

(60) Provisional application No. 62/198,357, filed on Jul. 29, 2015.

(51) Int. Cl.
*H04M 1/24* (2006.01)
*H04M 3/08* (2006.01)
(Continued)

(52) U.S. Cl.
CPC .... *H04M 3/2281* (2013.01); *G06F 17/30672* (2013.01); *G06F 17/30702* (2013.01);
(Continued)

(58) Field of Classification Search
CPC ......... G06F 17/30522; G06F 17/30528; G06F 17/3053; G06F 17/30979; G06F 17/241;
(Continued)

(56) References Cited

U.S. PATENT DOCUMENTS 6,731,730 B1 * 5/2004 Zolotov ................ H04M 15/00
379/121.05
7,088,806 B2 * 8/2006 Liu ...................... H04M 3/2218
379/121.05

(Continued)

OTHER PUBLICATIONS

International Search report for International Application No. PCT/US16/38398 dated Sep. 7, 2016, 12 pages.

*Primary Examiner* — Binh Kien Tieu
(74) *Attorney, Agent, or Firm* — Lowenstein Sandler LLP (57) ABSTRACT

A processing device identifies comparison subjects comprising a first subject and a second subject. The processing device builds a first network of a first profile of the first subject and a second network of a second profile of the second subject, wherein the first network and the second network are multi-degree connections networks. The processing device the first network and second network to produce a similarity score. The processing device examining first-degree connections between the first network and the second network and accounting for centralities that rely on information about the first network and the second network. Responsive to the similarity score exceeding a similarity threshold, indicating the first profile and the second profile correspond to a common profile for the first subject and the second subject.

18 Claims, 8 Drawing Sheets

(51) Int. Cl.
*H04M 3/22* (2006.01)
*H04M 15/00* (2006.01)
*H04L 29/08* (2006.01)
*G06F 17/30* (2006.01)

(52) U.S. Cl.
CPC ........ *H04L 67/306* (2013.01); *H04M 3/2218* (2013.01); *H04M 15/41* (2013.01)

(58) Field of Classification Search
CPC ......... G06F 17/30864; G06F 17/30958; G06F 17/30303; G06F 17/30882; G06K 9/6201; G06Q 10/10; G06Q 10/107; G06Q 50/01; H04L 51/12
USPC ............ 379/32.01, 32.02, 32.04, 32.05, 111, 379/112.01, 112.04, 112.08, 116, 118, 379/120, 121.05, 126, 133, 134
See application file for complete search history.

(56) References Cited

U.S. PATENT DOCUMENTS

| | | |
|---|---|---|
| 8,739,016 B1 | 5/2014 | Goldman |
| 2003/0134648 A1 | 7/2003 | Reed et al. |
| 2005/0060643 A1 | 3/2005 | Glass |
| 2007/0111707 A1 | 5/2007 | Pomerantz et al. |
| 2007/0165815 A1 | 7/2007 | Shaffer et al. |
| 2013/0138479 A1 | 5/2013 | Mohan et al. |
| 2014/0019443 A1 | 1/2014 | Golshan |
| 2014/0222835 A1 | 8/2014 | Lee |
| 2014/0344718 A1 | 11/2014 | Rapaport et al. |
| 2015/0072715 A1* | 3/2015 | Ireland .................... H04W 4/14 455/466 |
| 2015/0382162 A1* | 12/2015 | Ireland .................... H04L 51/38 455/466 |
| 2016/0212235 A1* | 7/2016 | Ireland .................... H04L 51/38 |
| 2017/0111364 A1* | 4/2017 | Rawat ................... H04L 63/102 |

* cited by examiner

DE-DUPING IDENTITIES USING NETWORK ANALYSIS AND BEHAVIORAL COMPARISONS

CROSS-REFERENCE TO RELATED APPLICATIONS

This application is a continuation of U.S. Nonprovisional patent application Ser. No. 15/185,545, filed Jun. 17, 2016, entitled "De-Duping Identities Using Network Analysis and Behavioral Comparisons," which claims the benefit of U.S. provisional patent application No. 62/198,357 filed Jul. 29, 2015, both of which are incorporated herein by reference in their entirety.

TECHNICAL FIELD

The invention relates to data duplication in law enforcement computer systems, and more particularly, to eliminating duplication in law enforcement identities using network analysis and behavioral comparisons.

BACKGROUND

Data duplication is a serious problem in law enforcement agencies. Duplication is generally attributed to two problems. The first is simply that users often misspell names. When an officer creates a person with the last name "Rodrigues," but the correct spelling is "Rodriguez," most systems would identify these persons as separate entities. The second problem is that not enough preventative measures are taken to protect against data duplication. While users are inputting identifying information about a person, the system should be regularly checking for possible matches in the database. Few systems do this, so users are rarely alerted that a duplicate may exist.

Solving the problem of removing duplicate pieces of information from a system is complex. It is difficult to make a determination as to whether two people are duplicates, especially when the piece of data is as complex as a person's profile.

BRIEF DESCRIPTION OF THE DRAWINGS

The present invention will be more readily understood from the detailed description of exemplary embodiments considered in conjunction with the following drawings, of which.

DETAILED DESCRIPTION

Implementations of the disclosure provide for de-duplicating (also referred to as "de-duping") identities using network analysis and behavioral comparisons. In one implementation, complex network architectures are compared rather than static, simple pieces of data. By using extended networks of individuals to detect duplicates identities or profiles (in which three, to even four, degrees of separation are examined), the level of accuracy when comparing individuals greatly increases. Additionally, implementations of the disclosure utilize centrality measures as another method to verify duplicate identities. Centrality measures may refer to graphical measures that describe a node's (e.g., computing device, logical device, etc.) position in a network. Extending this concept to people, a centrality measure may describe a person's possible role in a network. If two possible duplicates' acquaintances and acquaintances of acquaintances are not exactly identical, implementations of the disclosure can still compute scores for network popularity, influence, and connectivity to override inaccuracies found in simple network content comparisons.

One of the most significant shortcomings in trying to de-dupe subject identities is that most methods of comparison are very static. One previous solution for de-duping identities is facial image comparison. In facial image comparison, many images are relied on to detect users that use the same profile picture, and as such may be considered the same user. With facial image comparison, the number of differing pixels between Image A and Image B is calculated, and then each image is compared against random red-green-blue (RGB) noise as a benchmark. The actual (not relative) difference between images A and B can then be calculated.

Another prior solution for de-duping identities is basic string comparison. This method involves comparing strings between different profiles. The simplest version is binary. For example, a subject may list their hometown as Horsham, while another subject may list their hometown as Hershey. Because the comparison is purely true or false, this would evaluate to false. However, other methods can be implemented to find words that are similar. Fuzzy matching is an example of this. The fuzzy matching process works to find strings that are similar, if not identical. This method effectively measures the difference in letter composition, word length, and letter position to determine how similar two strings are. A good example of this is Levenshtein distance, which is an algorithm that takes into account the number of character changes and moves one must perform to translate one string into another.

An additional prior solution for de-duping identities is social network comparisons. For example, similarities can be found between individuals by comparing their friend lists in their social networks. If two people have near-identical friend lists (and near-identical friend exclusion lists) it is likely that the two subject profiles actually refer to the same person. However, this method does not take into account anything more than single degrees of connection. Adding additional degrees of separation can greatly increase the accuracy of comparison between networks. Additionally, no technical social network analysis is used to analyze the importance of the subject in their network.

The previous solutions for de-duping identities, such as those described above, do not allow for variability or the possibility of human error. Take the case of "John Rodrigues" and "John Rodriguez." When looking at these two identities from a de-duplication perspective, a string comparison algorithm would classify the two identities as completely different names. However, from a human's perspective, there may simply just be a misspelling. Facial image comparison (e.g., comparing profile pictures) is also an imperfect science. In the rare instances where one actually has access to two profiles' default pictures, image comparison software still falls far behind when compared to the human eye. Finally, the status quo for comparing social networks of two possible duplicate subjects is very basic. Most methods only take into account a subject's first degree connections, and place very little importance on a subject's location, influence, and connectivity in the network.

Figure 1:
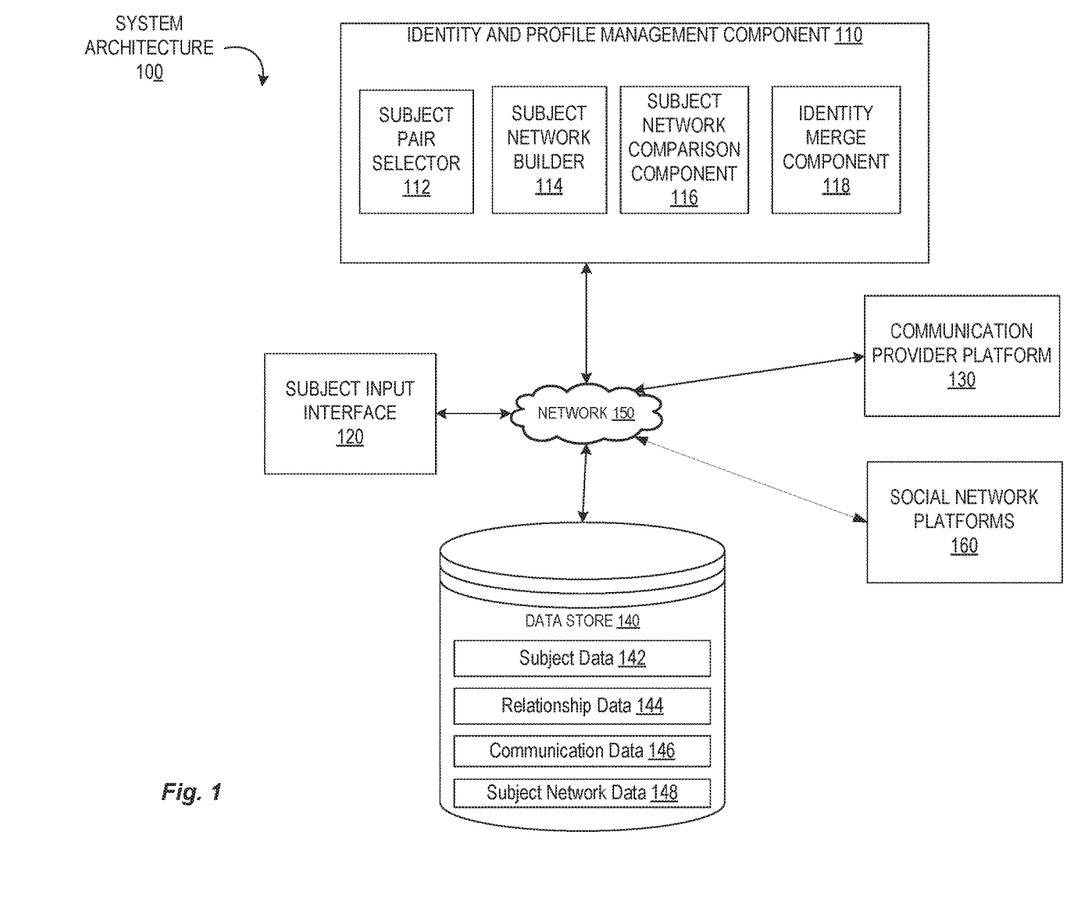
FIG. 1 illustrates an example system architecture for de-duplicating identities using network analysis and behavioral comparisons.

FIG. 1 illustrates an example system architecture 100 for de-duplicating identities using network analysis and behavioral comparisons. The system architecture 100 includes an identity and profile management component 110, a subject input interface 120, a communication provider platform 130, a social network platform 160, a data store 140, and a network 150. In one embodiment, network 150 may include one or more of a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one embodiment, the data store 140 may be may be a memory (e.g., random access memory), a cache, a drive (e.g., a hard drive), a flash drive, a database system, or another type of component or device capable of storing data. The data store 140 may also include multiple storage components (e.g., multiple drives or multiple databases) that may also span multiple computing devices (e.g., multiple server computers).

The identity and profile management component 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that manage and monitor identities and profiles of subjects and/or entities. For example, the identity and profile management component 110 may be part of a law enforcement platform that maintains information about subject identities with which the law enforcement organization has interacted. In some implementations, subject data (e.g., identity and profile data) may be entered into and monitored by identity and profile management component 110 via subject input interface 120. This subject data may be stored as subject data 142 in data store 140.

The identity and profile management component 110 includes a subject pair selector 112, a subject network builder 114, a subject network comparison component 116, and an identity merge component 118. This arrangement of components and/or modules may be a logical separation, and in other implementations, these modules or other components can be combined together or separated in further components, according to a particular implementation. Other components and/or modules in addition to those described herein may also be included in implementations of the disclosure.

The identity and profile management component 110 can compare complex network architectures rather than static, simple pieces of data. By using the extended networks of individuals to detect duplicates, in which the identity and profile management component 110 examines three, to even four, degrees of separation, the level of accuracy when comparing subjects or profiles greatly increases. Additionally, the identity and profile management component 110 also assesses centrality measures as a way to verify duplicate identities.

If two possible duplicates' acquaintances and acquaintances of acquaintances are not exactly identical, the identity and profile management component 110 can still compute scores for network popularity, influence, and connectivity to override inaccuracies found in simple network content comparisons. It is useful to analyze data outside of a person's profile in cases like these. Call patterns, personal interactions, and a person's role in a network can provide useful ways to de-dupe identities. In addition, a detailed technical social network analysis may be performed by identity and profile management component 110 in order to obtain values that would describe a subject's popularity, connectedness, and influence in a network and compare them to a potential duplicate subject.

The identity and profile management component 110 may periodically run as a background job as part of a system that manages identities and user profiles. The subject pair selector 112 would begin by finding all possible pairs of persons in the data store 140. For example, subject data 142 may include a profile for each subject managed by the system.

Subject network builder 114 may then, for each pair, build a network for each subject in the pair by collecting an inventory of each subject's centrality scores, call data records (CDRs), social connections, and network behavior may be collected. Subject network builder 114 may communicate with communication provider platform 130 and social network platform 160 to obtain relevant data, such as the CDRs and social connection information. Collected data may be stored as relationship data 144 and communication data 146 in data store 140. In addition, the built network for a subject may be stored as subject network data 148 in data store 140.

Subject network comparison component 116 may then, for each pair, compare the subjects' networks. In performing the comparison, the subject network comparison component 116 examines first-degree connections in the networks, as well as account for centralities that rely on information about the entire network (e.g., second, third, and fourth degree connections). For example, instead of analyzing information like a subject's immediate set of friends, the subject network comparison component 116 analyzes a subject's popularity, connectedness, and influence in the network context of the entire network. Furthermore, the subject network comparison component 116 cross-references relationship-based data with additional data like the CDRs in order to generate network-based data. As such, the subject network comparison component 116 can determine if the two potentially duplicated subjects are calling the same people, and if that's the case, increase the certainty of which the two identities are actually the same. By analyzing second, third, and fourth-degree connections (and on and on), the certainty with which the subject network comparison component 116 can conclude two identities are duplicates or not is increased.

In some implementations, if the subject network comparison component 116 determines that the subject networks of a pair of subjects exceeds some similarity threshold, the subject network comparison component 116 would alert the identity merge component 118 that there are possible duplicate identities in the database. The identity merge component 118 could then decide to merge the identities. In some implementations, the identity merge component 118 may seek authorization for an identity merger from a system user (e.g., administrator, etc.) before performing an identity merge operation.

Another example use case for implementations of the disclosure is in identifying burner phones for known subjects (e.g., criminals, etc.). A burner phone is a phone that a subject uses for a brief period (a few days) and then destroys, for fear of being tracked by law enforcement officials. As a subject cycles through these phones, it becomes easy for officers to lose track of the subject. A law enforcement officer cannot retrieve identifying information from a CDR aside from a phone number. The officer must match a number and name by obtaining the suspect's phone. However, by comparing existing call networks, implementations of the disclosure can identify, with a high degree of certainty, that suspect has actually switched to a new phone.

In this example, the identity and profile management component 110 may determine that a phone number is linked to a particular subject. In some cases, this information is obtained from subpoena of the phone records and matching the calling number to a phone a subject had obtained. The identity and profile management component 110 may then determine that the subject's phone number is no longer being used, indicating the suspect has obtained a new phone (a burner). The identity and profile management component 110 may then build the network of the subject's previous calls. The identity and profile management component 110 can then identify the most commonly-called acquaintances of the subject and notes the centrality scores for the subject.

The identity and profile management component 110 obtains the CDRs for the subject's common contacts. The identity and profile management component 110 then builds the network as defined by those new CDRs. The CDRs may act as the source of data that generates the networks. Using the call frequency list and centralities from the subject's old, known network, the identity and profile management component 110 searches for similar nodes in the subject's callees' new network. Any unknown nodes with similar call frequencies and centralities/location in the network are likely to be the original subject using a new burner phone.

Figure 2:
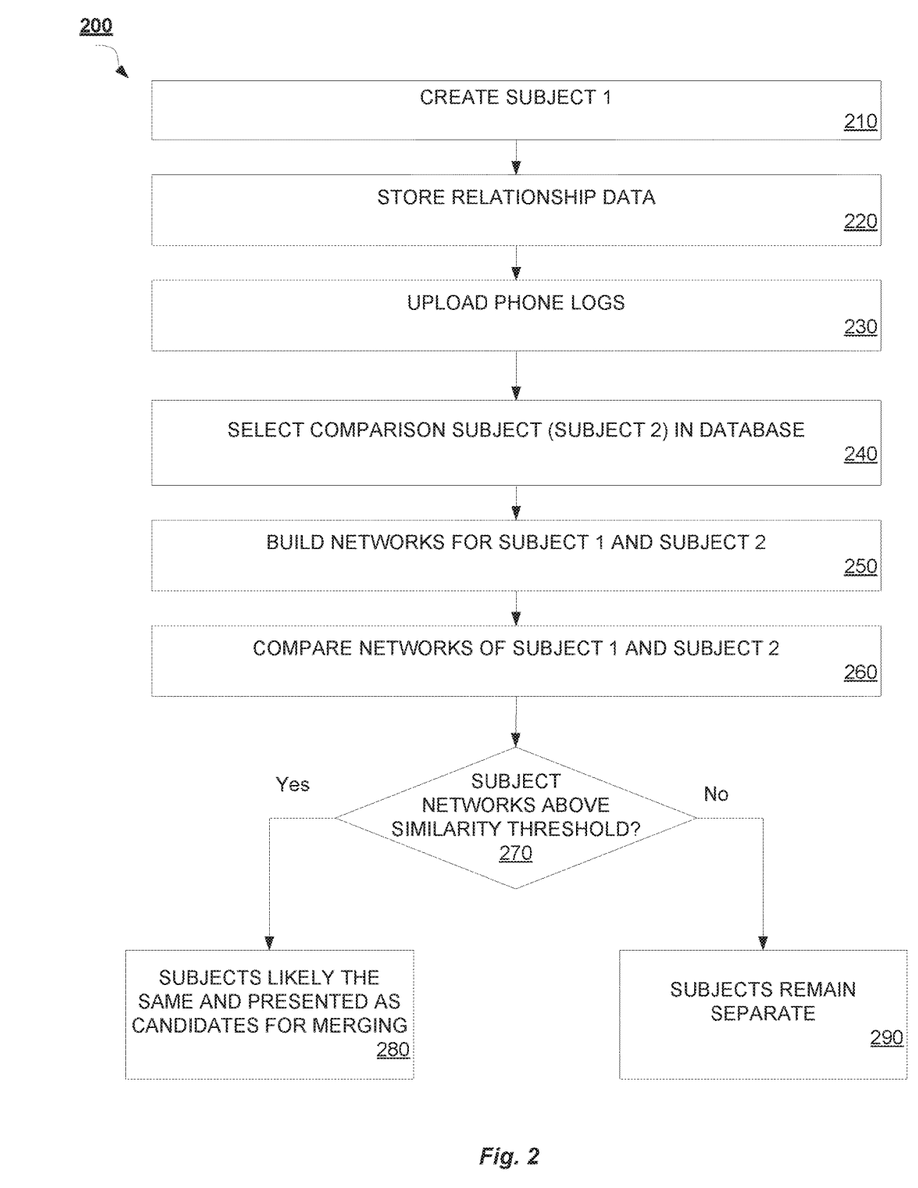
FIG. 2 is a flow diagram illustrating a method for de-duplicating identities using network analysis and behavioral comparison.

FIG. 2 is a flow diagram illustrating a method 200 for de-duplicating identities using network analysis and behavioral comparisons. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by identity and profile management component 110 of FIG. 1.

Method 200 begins at block 210 where a first subject ("subject 1") is created. Then, at block 220, relationship data for subject 1 is stored in a database. Further description of storing relationship data may be found below with respect to method 300 of FIG. 3. At block 230, phone logs (or other communication records) are obtained (e.g., uploaded) for the subject 1. Further description of uploading phone logs may be found below with respect to method 400 of FIG. 4. Then, at block 240, a comparison subject ("subject 2") is selected from the database. At block 250, multi-degree connection networks for subject 1 and subject 2 are built. Further description of building subject networks may be found below with respect to method 500 of FIG. 5. Then, at block 260, the built subject networks are compared to one another. The comparing comprises examining first-degree connections and/or multi-degree connections between the first network and the second network and accounting for centralities that rely on information about the entire first network and the entire second network. Further description of subject network comparison may be found below with respect to method 600 of FIG. 6.

At decision block 270, it is determined whether the subject networks exceed as similarity threshold based on the comparison at block 260. If not, method 200 proceeds to block 290 where the subject are maintained with separate identities/profiles. On the other hand, if the subject networks do exceed the similarity threshold, then method 200 proceeds to block 280 where the subject are considered likely to be the same and are presented as candidates for a merge operation.

Figure 3:
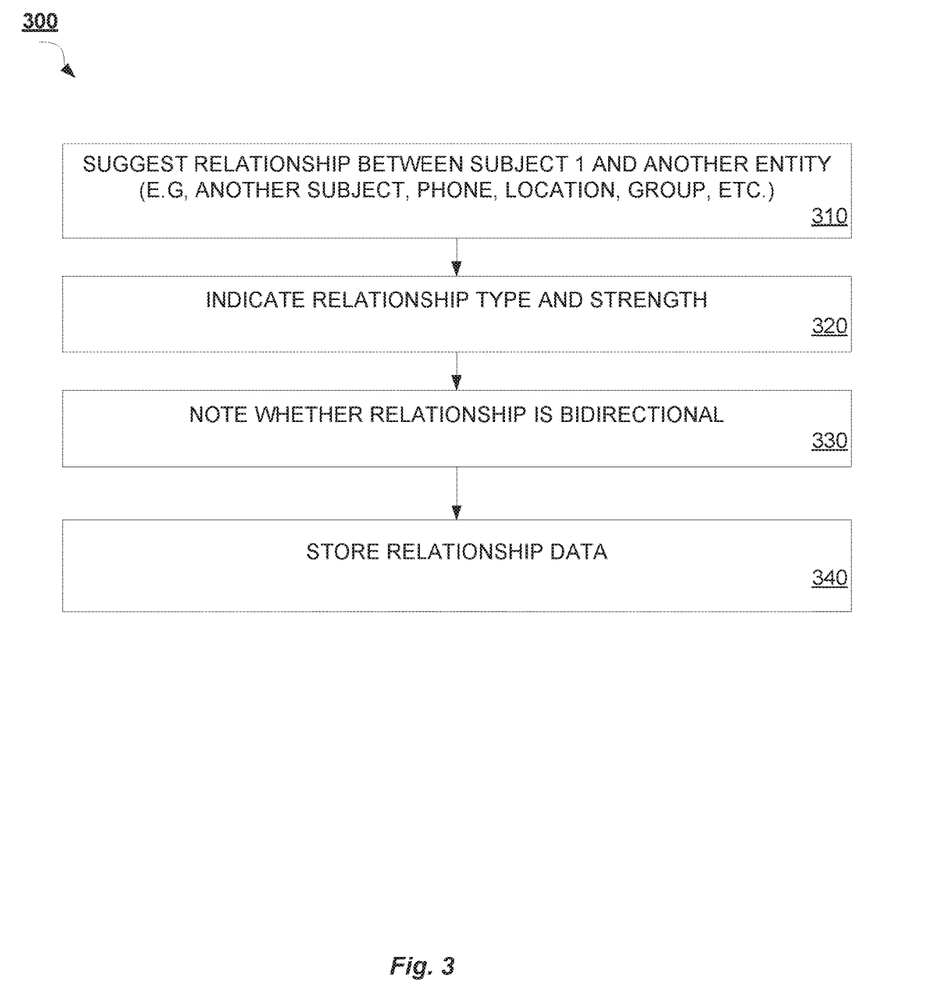
FIG. 3 is a flow diagram illustrating a method for storing relationship data for use in de-duplicating identities.

FIG. 3 is a flow diagram illustrating a method 300 for storing relationship data for use in de-duplicating identities. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by subject pair selector 112 of FIG. 1.

Method 300 begins at block 310 where a relationship is suggested between a subject 1 and another entity (e.g., another subject/person, a phone, location, group, etc.). Then, at block 320, a relationship type and strength is indicated. At block 330, is it noted whether the relationship is bidirectional. Lastly, at block 340, the relationship data is stored for the subject 1.

Figure 4:
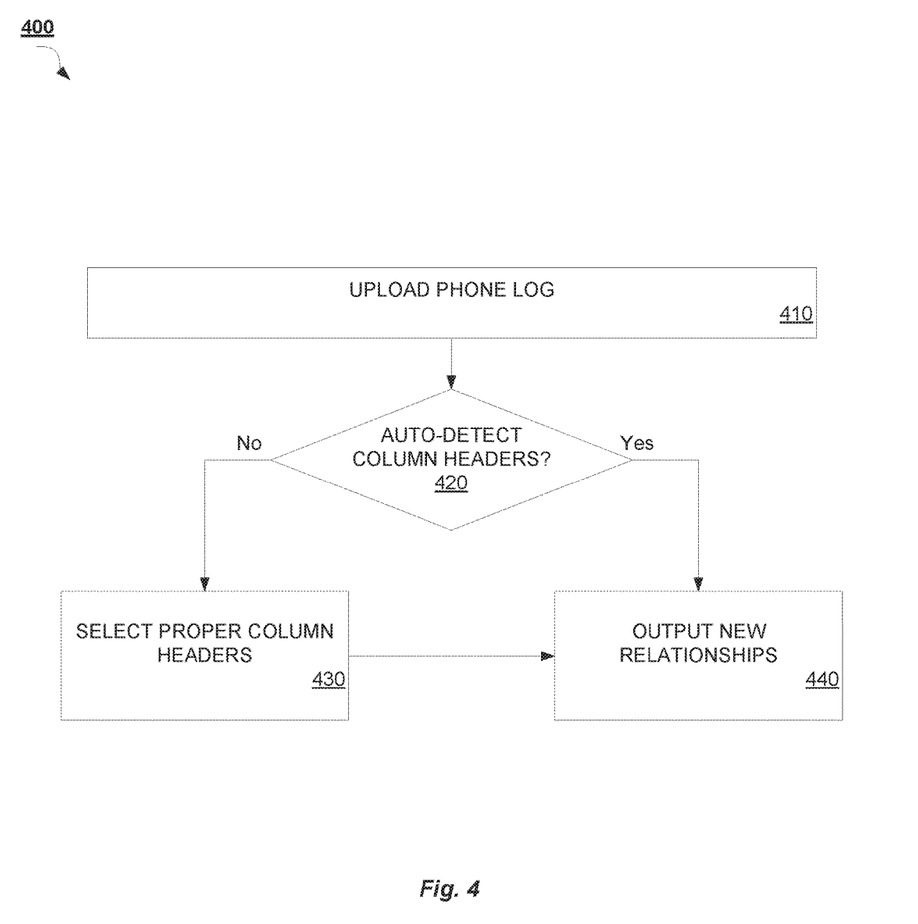
FIG. 4 is a flow diagram illustrating a method for uploading phone logs for use in de-duplicating identities.

FIG. 4 is a flow diagram illustrating a method 400 for uploading phone logs for use in de-duplicating identities. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by subject network builder 114 of FIG. 1.

Method 400 begins at block 410 where a phone log (e.g., CDR) is uploaded. In one implementation, the phone log may be provided from a communications provider platform. At decision block 420, it is determined whether column headers can be auto-detected in the phone log. If so, then method 400 proceeds to block 440 where new relationships are output using the uploaded phone log. If not, then method 400 continues to block 430 where proper header columns are manually selected. Then method 400 may continue to block 440 for output of new relationships based on the uploaded phone log.

Figure 5:
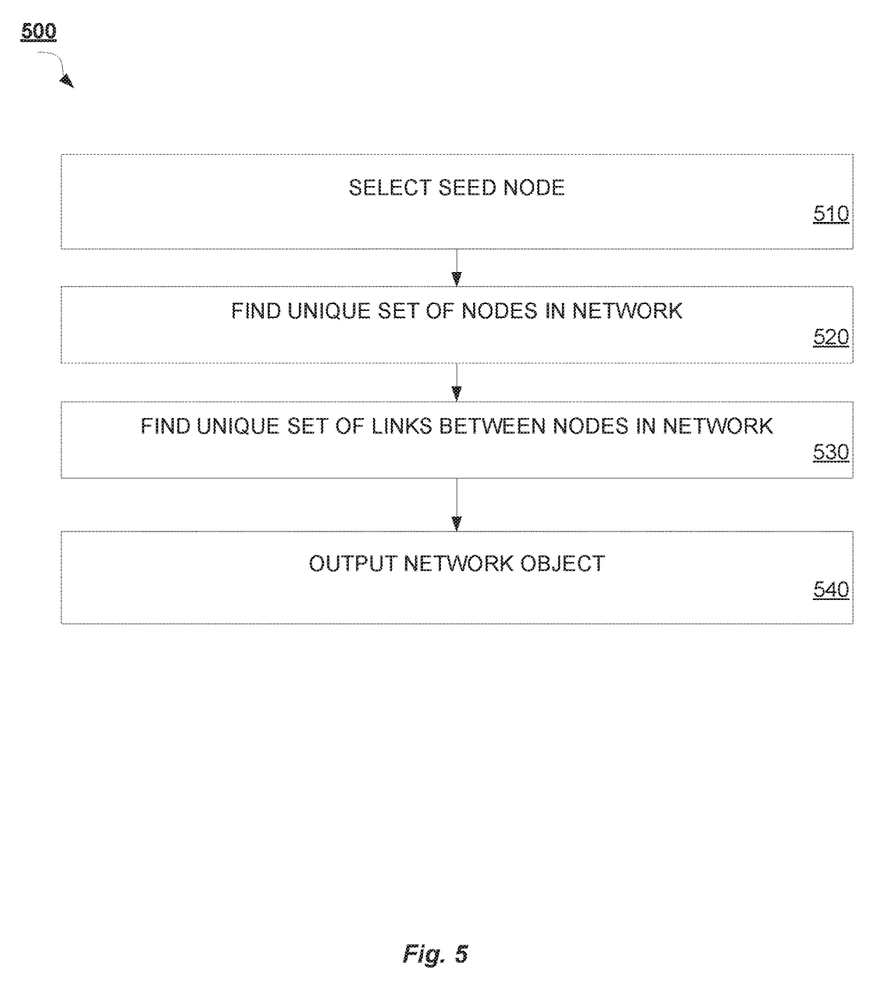
FIG. 5 is a flow diagram illustrating a method for building a subject network for use in de-duplicating identities.

FIG. 5 is a flow diagram illustrating a method 500 for building a subject network for use in de-duplicating identities. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by subject network builder 114 of FIG. 1.

Method 500 begins at block 510 where a seed node is selected 510. In one implementation, a seed node may refer to the focus node that is being analyzed. Then, at block 520, a unique set of nodes are located in the network. At block 530, a unique set of links in the network is determined among the seed node and the unique set of nodes. Lastly, at block 540, a network object is outputted.

Figure 6:
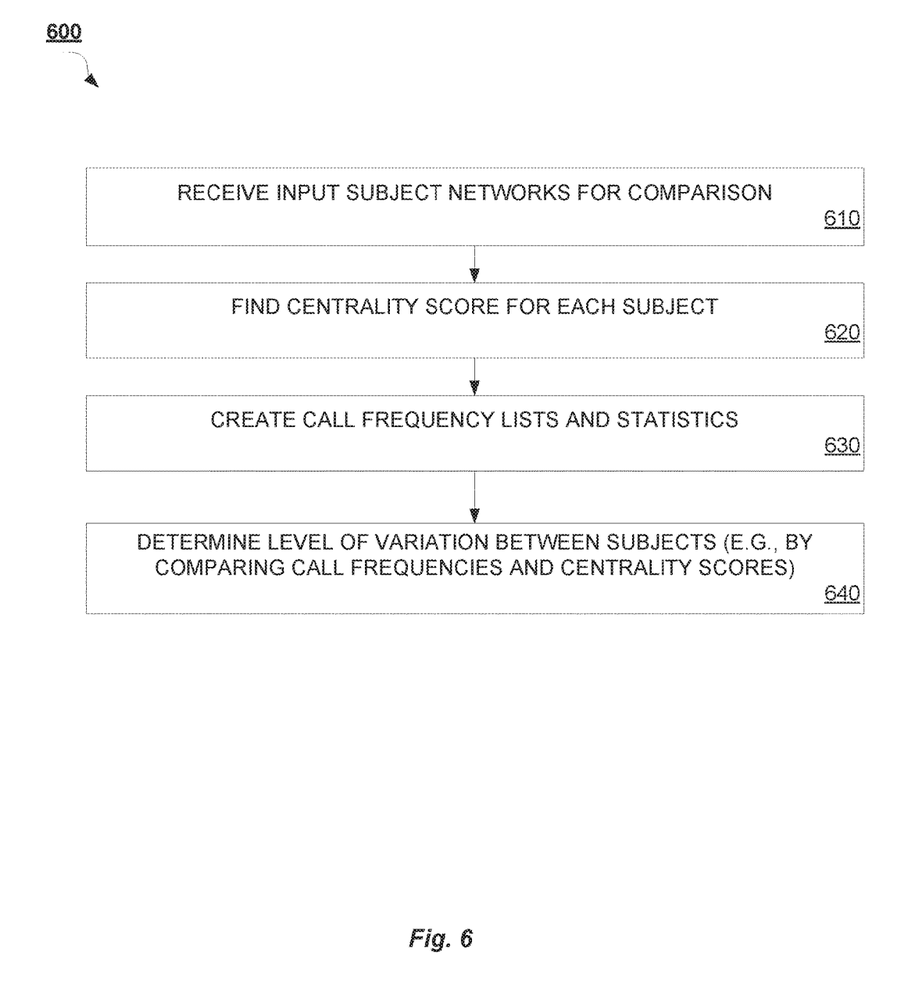
FIG. 6 is a flow diagram illustrating a method for de-duplicating identities using network analysis and behavioral comparisons.

FIG. 6 is a flow diagram illustrating a method 600 for de-duplicating identities using network analysis and behavioral comparisons. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 is performed by subject network comparison component 116 of FIG. 1.

Method 600 begins at block 610 where input subject networks are received from comparison. Then, at block 620, a centrality score for each subject is determined. At block 630, call frequency lists and other statistics are created for the subjects. Lastly, at block 640, a level of variation between the subjects is determined. In one implementation, the level of variation may be determined by comparing call frequencies and centrality scores that were determined at block 620 and 630.

Figure 7:
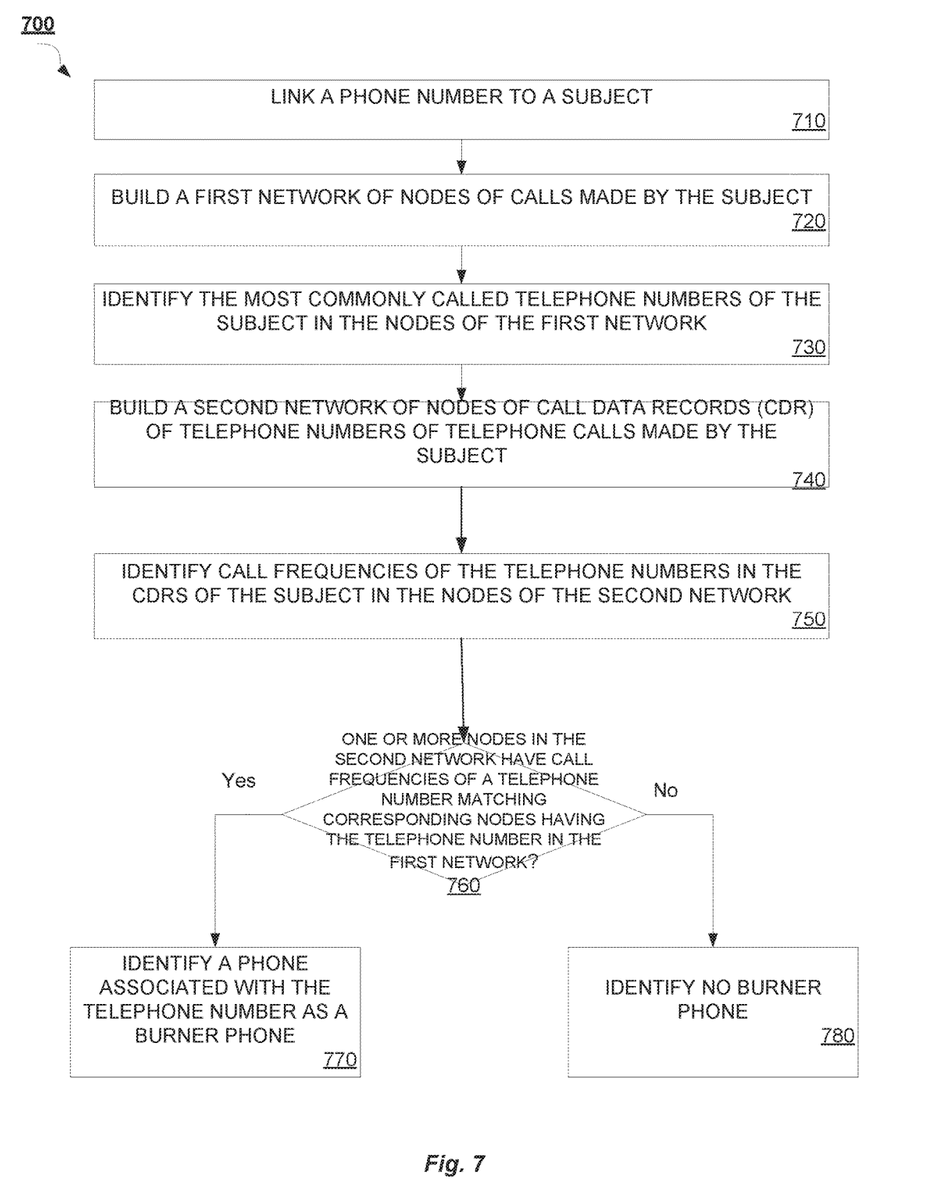
FIG. 7 is a flow diagram illustrating a method for identifying burner phones for known subjects.

FIG. 7 is a flow diagram illustrating a method 700 for identifying burner phones for known subjects (e.g., criminals, etc.). Method 700 may be performed by processing logic that may comprise hardware (e.g., circuitry, dedicated logic, programmable logic, microcode, etc.), software (such as instructions run on a processing device), firmware, or a combination thereof. In one embodiment, method 700 is performed by subject network comparison component 116 of FIG. 1.

Method 700 begins at block 710 where an officer or a processing device links a phone number to a subject. Linking a phone number to a subject may include subpoenaing phone record of the subject and matching a calling number to a phone the subject had obtained. The officer may determine that the calling number is no longer being used.

At block 710, the officer or processing device determine that the phone number of the subject is no longer being used. At block 720, the processing device builds a first network of nodes comprising calls made by the subject, e.g., by using call data records obtained by a subpoena or warrant. At block 730, the processing device identifies the most commonly called telephone of the subject by traversing the nodes in the network. At block 740, the processing device builds a second network of nodes using call data records (CDR) of telephone calls made by the subject. Building the second network may comprise obtaining more CDRs from a judge and adding the obtained CDRs to the second network. Building the second network of the subject's calls may further include associating centrality scores for the suspect along with a corresponding CDR. At block 750, the processing device identifies call frequencies of the telephone numbers in the CDRs of the subject by traversing the nodes in the second network.

If, at block 760, the processing device determines that one or more nodes in the second network have call frequencies of a telephone number matching corresponding nodes in the first network, then at block 770, the processing device identifies a phone associated with the telephone number as a burner phone. The processing device may also match associated centralities or a location corresponding nodes in the second network to the first network. If, at block 750, the processing device determines that no nodes in the second network have call frequencies of a telephone number matching corresponding nodes in the first network, then at block 780, the processing device determines that there is no burner phone.

Figure 8:
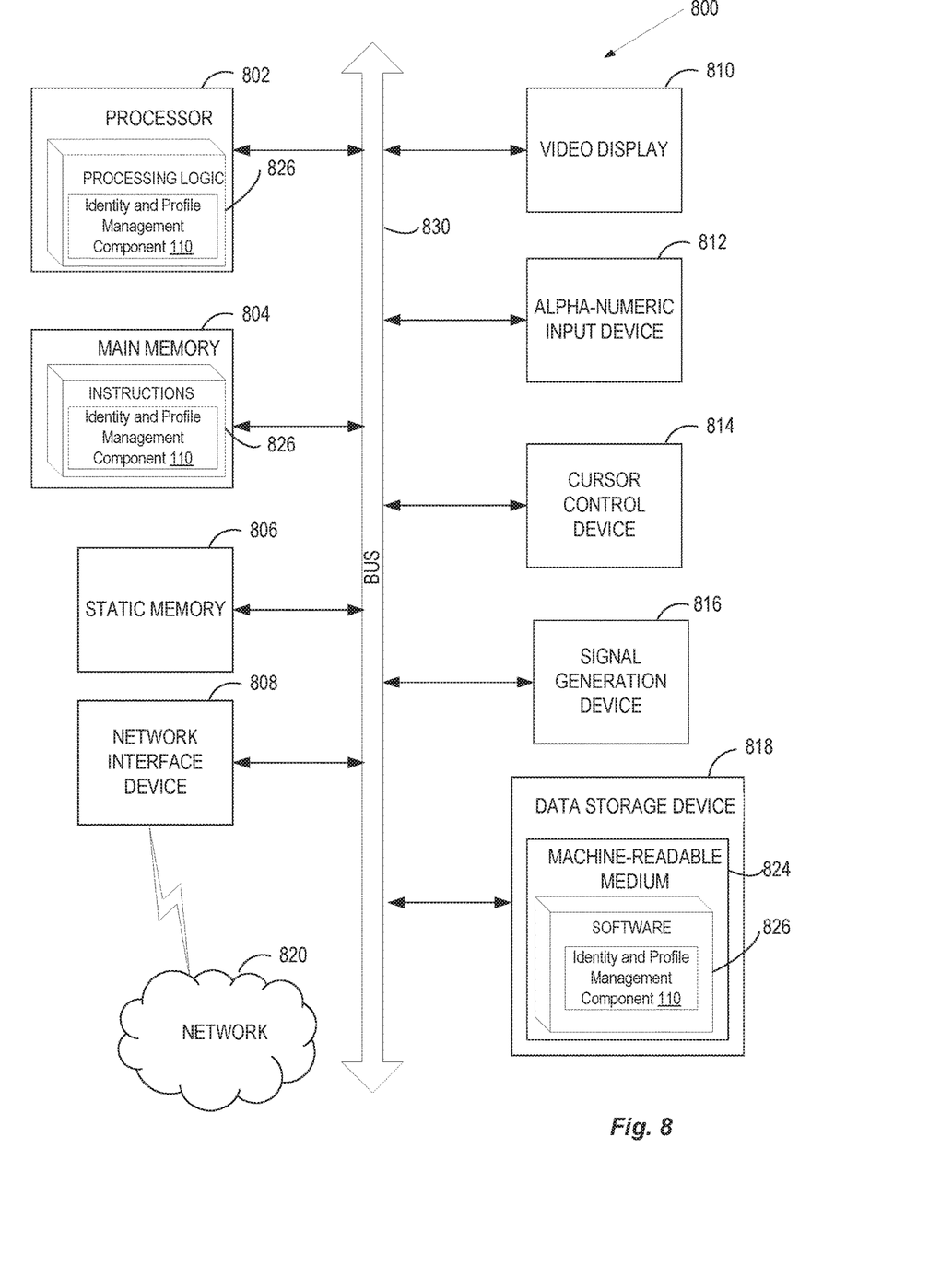
FIG. 8 illustrates a diagrammatic representation of a machine in the example form of a computer system within which a set of instructions, for causing the machine to perform any one or more of the methodologies discussed herein, may be executed.

FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 includes a processing device 802, a main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 702 is configured to execute the processing logic 826 for performing the operations and steps discussed herein.

The computer system 800 may further include a network interface device 808 communicably coupled to a network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 824 on which is stored software 826 embodying any one or more of the methodologies of functions described herein. The software 826 may also reside, completely or at least partially, within the main memory 804 as instructions 826 and/or within the processing device 802 as processing logic 826 during execution thereof by the computer system 800; the main memory 804 and the processing device 802 also constituting machine-accessible storage media.

The machine-readable storage medium 824 may also be used to store instructions 726 to implement an identity and profile management component 110 to perform de-duping identities using network analysis and behavioral comparisons in a computer system, such as the computer system described with respect to FIG. 1, and/or a software library containing methods that call the above applications. While the machine-accessible storage medium 828 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   identifying, by a processing device, a plurality of comparison subjects comprising a first subject and a second subject;
   collecting, by the processing device, social connection data from a social network platform;
   building, by the processing device, a first network of a first profile of the first subject and a second network of a second profile of the second subject in view of the social connection data, wherein the first network and the second network comprise multi-degree connection networks;
   comparing, by the processing device, the first network and the second network to produce a similarity score, wherein the comparing comprises examining first-degree connections between the first network and the second network; and
   responsive to the similarity score exceeding a similarity threshold, generating, by the processing device, an alert to cause one or more processing devices to merge the first profile and the second profile into a common profile for the first subject and the second subject.

2. The method of claim 1, wherein the first profile and the second profile further comprise an inventory of at least one of centrality scores, call data records (CDRs), social connections, or network behavior.

3. The method of claim 1, wherein the first network information about the entire network comprises second degree or greater connections.

4. The method of claim 1, wherein the comparing further comprises examining at least one of a popularity, a connectedness, or an influence in a network context of the first network and the second network.

5. The method of claim 1, wherein the comparing further comprises examining cross-reference relationship-based data with additional data in order to generate network-based data.

6. The method of claim 1, further comprising seeking, by the processing device, authorization for the merge from a system user before performing the merge operation.

7. The method of claim 1, wherein causing the merge of the first profile and the second profile comprises merging identity data associated with the first subject with identity data associated with the second subject.

8. The method of claim 1, further comprising collecting communication records of the first subject and the second subject and inserting the communication records into the first network and the second network, respectively.

9. The method of claim 8, further comprising comparing the collected communication records of the first subject and the second subject for at least one of a relationship type, relationship strength, or whether a relationship is bidirectional.

10. The method of claim 1, further comprising, wherein building the first network and the second network comprises:
   selecting a seed node for a network;
   locating a unique set of nodes in the network;
   determining a unique set of links in the network among the seed node and the unique set of nodes; and
   outputting a network object.

11. The method of claim 1, wherein the comparing comprises:
   determining a centrality score for each of the first subject and the second subject;
   creating a call frequency list for each of the first subject and the second subject; and
   determining a level of variation between the first subject and the second subject in view of centrality scores and call frequency lists.

12. The method of claim 1, wherein the comparing the first network and the second network to produce a similarity score further comprises accounting for centralities that rely on information about the first network and the second network.

13. The method of claim 1 further comprising, responsive to the similarity score exceeding a similarity threshold, presenting the first profile of the first subject and the second profile of the second subject as candidates for a merge operation.

14. A system comprising:
   a memory;
   a processing device operatively couple to the memory to:
      identify comparison subjects comprising a first subject and a second subject;
      collect social connection data from a social network platform;
      build a first network of a first profile of the first subject and a second network of a second profile of the second subject in view of the social connection data, wherein the first network and the second network comprise multi-degree connection networks;
      compare the first network and the second network to produce a similarity score, wherein the comparing comprises examining first-degree connections between the first network and the second network; and
      responsive to the similarity score exceeding a similarity threshold, generate an alert to cause one or more processing devices to merge the first profile and the second profile into a common profile for the first subject and the second subject.

15. A method, comprising:
   linking a phone number to a subject;
   determining that the phone number of the subject is no longer being used;
   identifying, by the processing device, commonly called telephone numbers of the subject by traversing a first network of nodes that comprises calls made by the subject;
   identifying, by the processing device, call frequencies of telephone numbers of the subject by traversing a second network of nodes comprising call data records (CDRs) of the telephone numbers of the subject; and
   responsive to determining that one or more nodes in the second network have call frequencies of a telephone number matching corresponding nodes having the telephone number in the first network, generating an alert identifying a phone associated with the telephone number as a burner phone.

16. The method of claim 15, wherein linking a phone number to a subject comprises subpoenaing phone record of the subject and matching a calling number to a phone the subject had obtained.

17. The method of claim 15, wherein determining that or one more nodes in the second network have call frequencies of a telephone number matching corresponding nodes in the first network having the telephone number further comprises matching associated at least one of centralities or a location corresponding nodes in the second network to the first network.

18. A system comprising:
   a memory;
   a processing device operatively couple to the memory to:
      link a phone number to a subject;
      determine that the phone number of the subject is no longer being used;
      identify commonly called telephone numbers of the subject by traversing a first network of nodes that comprises calls made by the subject;
      identify call frequencies of telephone numbers of the subject in call data records of the subject by traversing a second network of nodes that comprise the call data records of the telephone numbers of the subject; and
      responsive to determining that one or more nodes in the second network have call frequencies of a telephone number matching corresponding nodes having the telephone number in the first network, generating an alert identifying a phone associated with the telephone number as a burner phone.

* * * * *